2/5/85 OR 4,497,538

United States Patent [19]

Patel

[11] Patent Number: 4,497,538

[45] Date of Patent: Feb. 5, 1985

[54] FILLED TRANSMISSION CABLE

[75] Inventor: Naren I. Patel, Hickory, N.C.

[73] Assignee: Siecor Corporation, Hickory, N.C.

[21] Appl. No.: 521,954

[22] Filed: Aug. 10, 1983

[51] Int. Cl.[3] ........................ B32B 27/00; G02B 5/16; H01B 7/00

[52] U.S. Cl. ................................ 350/96.23; 174/23 C; 174/23 R; 428/375; 428/383

[58] Field of Search ....................... 428/375, 379, 383; 174/23 C, 23 R; 350/96.23

[56] References Cited

U.S. PATENT DOCUMENTS

| | | | |
|---|---|---|---|
| 4,176,240 | 11/1979 | Sabia | 174/23 C |
| 4,190,570 | 2/1980 | Kaufman | 174/23 C |
| 4,259,540 | 3/1981 | Sabia | 174/23 C |
| 4,324,453 | 4/1982 | Patel | 174/23 C |

*Primary Examiner*—Lorraine T. Kendell
*Attorney, Agent, or Firm*—Roy B. Moffitt

[57] ABSTRACT

An improved transmission cable containing a filling material having superior handling and melt point characteristics useful for waterproofing telecommunication cables composed of a styrene-ethylene butylene-styrene block copolymer dissolved in petrolatum with polyethylene added for consistency and to increase the melting point of the mixture.

5 Claims, 1 Drawing Figure

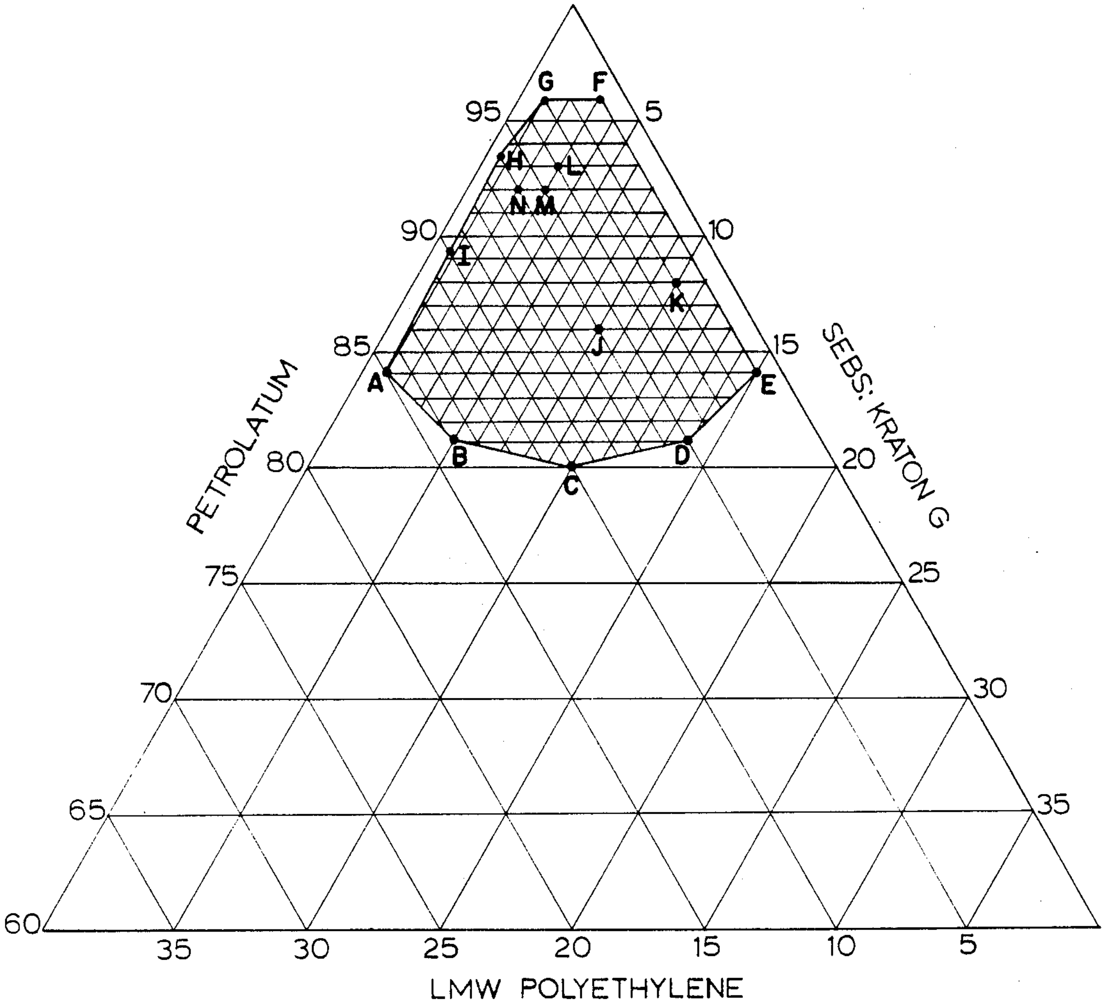
G
F
95
5
H
L
N
M
90
10
I
K
85
J
15
A
E
PETROLATUM
SEBS: KRATON G
B
D
80
20
C
75
25
70
30
65
35
60
35
30
25
20
15
10
5
LMW POLYETHYLENE

FILLED TRANSMISSION CABLE

BACKGROUND OF THE INVENTION

Most all communications cables, both copper and glass, installed in domestic communication systems are buried underground. Because of the antagonistic environment encountered, water being the chief concern, these cables are waterproofed. U.S. Pat. No. 4,351,913 and 4,176,240, the contents of which are incorporated herein by references as if faithfully reproduced, report that attempts to waterproof buried cable began nearly 100 hundred years ago, but were not successful in the practical sense until the production of plastic insulated cable (PIC) during the 1950's. It was general practice, where water was a problem, to pressurize the interior of the cable. Although this practice was successful in excluding water from the cable interiors, pressurized cables are expensive to maintain and for this reason have fallen from general use.

Unpressurized unfilled PIC cables fail to solve the water problem because water migrates through the plastic jacket into the interior of the cable and disrupts or deteriorates communication service. Water can also penetrate a PIC sheath through a localized opening and then is able to follow any channel inside the cable as far as physical forces will allow, often hundreds of feet, to ultimately accumulate and flood a local segment. This water upsets the capacitance balance of electrical transmission lines and introduces potential corrosion, which after extended time, ends to deteriorate the useful life of the water-soaked transmission medium. Water flooding of a cable containing optical waveguides can be deleterious to optical transmission, especially when there is alternate freezing and thawing which exacerbate any minute pre-existing cracks.

One widely adopted solution to stop the entry and migration of water in a communications cable is to fill the interstices within the cable with a water-insoluble filling material having the propensity to plug the cable. It has been said many times and recently repeated in U.S. Pat. Nos. 4,176,240 and 4,351,913, that the physical function of filling a cable with filling material is obvious, but the selection of the particular filling material is not. In the selection process, one must consider the hydrophobic nature of the materials, stability in aging, low and high temperature properties, processing characteristics, handling characteristics, dielectric properties, shrinkage, toxicity and cost, just to name the important ones.

One of the challenges facing present day design of cable is to find a suitable filling material with a melting point above 75° C. This problem was identified and only partially faced in U.S. Pat. No. 4,351,913. The majority of the compositions identified and disclosed in this patent indicated a drip temperature of no greater than 75° C. In U.S. Pat. No. 4,176,240, a flow point or drip point of a maximum of 70° C. was achieved by the disclosed filling material. The forementioned patents, along with U.S. Pat. No. 4,324,453 represent the state of the known prior art relative to the instant invention.

U.S. Pat. No. 4,351,913 discloses a mixture of a block copolymer dissolved in a paraffinic or napathenic mineral oil, mixed with an inorganic (glass or ceramic) hollow microspheres plus an additive of either low molecular weight polyethylene or glycerol hydroxy stearate.

The present invention is an improvement over this prior art, the various ingredients employed being as follows:

(a) Block Copolymer: Styrene-ethylene butylene-styrene (SEBS) having a styrene to rubber ratio of 0.39 to 0.41, and a specific gravity of approximately 0.91. Such preferred SEBS block copolymers are available from Shell Chemical Company, Houston, Texas, under a trade designations Kraton G-1650 and G-1652.

(b) Petrolatum: a mixture of microcrystalline waxes and oil. Preferably the amount of oil in the petrolatum used with the instant invention is no more than 15 percent as determined by ASTM D 721. Such a material can be procured from Penreco, Inc. of Butler, Pa. However, all so-called cable grade petrolatums are deemed to be operable. A typical petrolatum used had a nominal melting point of 57.2° C., density of 0.88 grams/cm$^3$ at room temperature, oil content of no more than 15 weight percent, dielectric constant of 2.25 maximum at $10^5$ to $10^6$ Hertz and dissipation factor of 0.0004 maximum at $10^5$ Hertz and 0.0008 maximum at $10^6$ Hertz. It also contained a small amount of an antioxidant additive, namely 0.2 weight percent Irganox-1030, available from Ciba-Geigy, Ardsley, N.Y.

(c) Additive: a low molecular weight polyethylene having a molecular weight range from 1,000 to 10,000 and a specific gravity of at least 0.90. A preferred polyethylene, as used in the present invention, has a specific gravity from 0.93 to 0.94. A polyethylene of this nature is manufactured by the Allied Chemical Company of Morristown, N.J. and sold under the mark "AC-8." Other low molecular weight polyethylenes are also operable.

The block copolymers and polyethylene are dissolved in the petrolatum. The amounts of the ingredients described below have been found to give a cable filling material that meets the functional requirements of the cable technology, have handling characteristics superior to those of the prior art materials, and in most cases a melting point in excess of 75° C.

BRIEF DESCRIPTION OF THE DRAWING

The FIGURE is a ternary compositional diagram the shaded portion of which delimits the compositional ranges of the cable filling material of the invention.

DETAIL DESCRIPTION OF THE INVENTION

Various petrolatum-block copolymer mixtures were formulated in arriving at the ingredients above described and their preferred proportions. Such preferred proportions are indicated in the shaded area delimited by lines AB, BC, CD, DE, EF, FG, GH, HI, and IA of the FIGURE. Some of the test data used to arrive at the preferred composition are given in the following table. All constituents are given in weight percentages.

TABLE I

| Composition Number | Constituents | Melting Point |
|---|---|---|
| A-520 | Kraton G-1650 10%<br>AC-8 Polyethylene 2%<br>Petrolatum 88% | 95° C.–98° C. |
| B-520 | Kraton G-1650 1%<br>AC-8 Polyethylene 15%<br>Petrolatum 84% | 88° C.–91° C. |
| C-520 | Kraton G-1650 1%<br>AC-8 Polyethylene 10% | 84° C.–87° C. |

TABLE I-continued

| Composition Number | Constituents | Melting Point |
|---|---|---|
| | Petrolatum 89% | |
| D-520 | Kraton G-1650 0.5%<br>AC-8 Polyethylene 6%<br>Petrolatum 93.5% | 83° C.-84° C. |
| E-520 | Kraton G-1650 1%<br>AC-8 Polyethylene 3%<br>Petrolatum 96% | 74° C.-77° C. |
| F-520 | Kraton G-1650 3%<br>AC-8 Polyethylene 1%<br>Petrolatum 96% | 78° C.-81° C. |
| G-520 | Kraton G-1650 14%<br>AC-8 Polyethylene 5%<br>Petrolatum 81% | 115° C.-117° C. |
| F-513 | Kraton G-1650 10%<br>AC-8 Polyethylene 10%<br>Petrolatum 80% | 94° C.-97° C. |
| G-513 | Kraton G-1650 15%<br>AC-8 Polyethylene 1%<br>Petrolatum 84% | 100° C.-102° C. |
| H-520 | Kraton G-1650 5%<br>AC-Polyethylene 14%<br>Petrolatum 81% | 93° C.-95° C. |
| I-520 | Kraton G-1650 8%<br>AC-Polyethylene 6%<br>Petrolatum 86% | 92° C.-94° C. |
| A-531 | Kraton G-1650 2%<br>AC-8 Polyethylene 6%<br>Petrolatum 92% | 85° C.-88° C. |
| A-613 | Kraton G-1650 3%<br>AC-8 Polyethylene 4%<br>Petrolatum 93% | 84° C.-87° C. |
| B-613 | Kraton G-1652 3%<br>AC-8 Polyethylene 4%<br>Petrolatum 93% | 79° C.-82° C. |
| C-613 | Kraton G-1650 3%<br>AC-8 Polyethylene 5%<br>Petrolatum 92% | 81° C.-84° C. |
| D-613 | Kraton G-1652 3%<br>AC-8 Polyethylene 5%<br>Petrolatum 92% | 81° C.-83° C. |
| A-607 | Kraton G-1652 10%<br>AC-8 Polyethylene 10%<br>Petrolatum 80% | 89° C.-92° C. |
| B-607 | Kraton G-1652 15%<br>AC-8 Polyethylene 1%<br>Petrolatum 84% | 95° C.-98° C. |
| C-607 | Kraton G-1652 10%<br>AC-8 Polyethylene 2%<br>Petrolatum 88% | 90° C.-94° C. |
| D-607 | Kraton G-1652 1%<br>AC-8 Polyethylene 15%<br>Petrolatum 84% | 88° C.-90° C. |
| E-607 | Kraton G-1652 1%<br>AC-8 Polyethylene 10%<br>Petrolatum 89% | 83° C.-87° C. |
| F-607 | Kraton G-1652 0.5%<br>AC-8 Polyethylene 6%<br>Petrolatum 93.5% | 82° C.-84° C. |
| G-607 | Kraton G-1652 1%<br>AC-8 Polyethylene 3%<br>Petrolatum 96% | 78° C.-81° C. |
| H-607 | Kraton G-1652 3%<br>AC-8 Polyethylene 1%<br>Petrolatum 96% | 72° C.-75° C. |
| I-607 | Kraton G-1652 14%<br>AC-8 Polyethylene 5%<br>Petrolatum 81% | 100° C.-103° C. |
| J-607 | Kraton G-1652 5%<br>AC-8 Polyethylene 14%<br>Petrolatum 81% | 89° C.-91° C. |
| K-607 | Kraton G-1652 8%<br>AC-8 Polyethylene 6%<br>Petrolatum 86% | 88° C.-91° C. |
| L-607 | Kraton G-1652 2%<br>AC-8 Polyethylene 6%<br>Petrolatum 92% | 83° C.-86° C. |

Petrolatum contains 0.2% antioxident (IRGANOX-1035).

Compositions L-607 and A-531 are the preferred embodiments. The following represent compositions A through N on the FIGURE:

| Letter | Composition | Letter | Composition |
|---|---|---|---|
| A | D-607 and B-520 | H | D-520 and F-607 |
| B | H-520 and J-607 | I | C-520 and E-607 |
| C | F-513 and A-607 | J | K-607 and I-520 |
| D | I-607 and G-520 | K | C-607 and A-520 |
| E | G-513 and B-607 | L | B-613 and A-613 |
| F | H-607 and F-520 | M | C-613 and D-613 |
| G | G-607 and E-520 | N | A-531 and L-607 |

The compositions were evaluated in terms of their melting point using a Fisher-Johns melting point apparatus sold by the Fisher Scientific Company. It will be noted that most of the melting points determined were above 75° C. with only a few (H-607 and E-520) showing any evidence of being below 75° C.

The antioxidant can be one of two available from Ciba Guigy of Ardsley, N.Y., sold under the marks IRGANOX—1010 and IRGANOX—1035.

Cables containing the disclosed cable filling material can be fabricated by any suitable known apparatus and techniques well known in the art. An exemplary technique for fabricating a twisted, multipaired communication cable includes the steps of passing a plurality of conductors into a forming zone to produce a core and subsequently passing the thus made core through a filling head. Cable filling material is then applied at a predetermined temperature and under sufficient pressure to force it into the interstices within the core. The filling head can be adjusted to provide a layer of the filling material around the periphery of the core of the conductors if desired. The filled core is then passed to a core wrapping machine which longitudinally applies a strip of plastic (core wrap) around the core. If desired, the outermost surface of the core wrap may be coated with the filling material. Subsequently, the wrapped core is passed into a forming apparatus, which longitudinally applies a strip of polymer coated or uncoated aluminum or other metal tape around the core wrap in a conventional manner to form a shield. After the shield is applied, the composite thus formed is passed through a cross-head die attached to an extruder, which extrudes a layer of plastic (e.g., polyethylene) around the shield to form a jacket. The heat of extrusion causes the shield to bond to the jacket, if so desired. The resulting cable is cooled then collected on a takeup reel.

Similar or same steps may be used to manufacture the filled cable using optical waveguides.

While the several foregoing steps can be formed individually with interruptions between the steps, it is generally preferred that the cable be manufactured on a continuous basis to avoid the necessity of using storage reels between the several steps.

Although invention has been described in considerable detail, such detailed description is only for the purpose of illustrating the specific embodiments. It is evident that variations and modifications can be made from those described without departing from the spirit and scope of the invention.

What is claimed is:

1. A cable comprising a plurality of conductors contained within a jacket leaving voids between the conductors and the jacket and a filling material substantially filling the voids, the invention characterized in that the filling material consists essentially of a mixture of:

(A) styrene-ethylene butylene-styrene block copolymer having a styrene to rubber ratio of 0.39 to 0.41, (B) polyethylene having a molecular weight from 1,000 to 10,000, and, (C) petrolatum, the ingredients A, B and C having relative proportions falling within the shaded area abounded by ABCDEFGHI of the FIGURE.

2. The cable of claim 1 wherein the conductors transmit electrical communications signals.

3. The cable of claim 2 wherein the conductors transmit light.

4. The cable of claims 1, 2 or 3 wherein the polyethylene has a specific gravity of at least 0.90.

5. The cable of claims 1, 2 or 3 wherein block copolymer has a specific gravity of at least 0.91.

* * * * *